United States Patent
Nguyen et al.

(10) Patent No.: US 8,713,699 B2
(45) Date of Patent: Apr. 29, 2014

(54) SECURING INFORMATION BY HIDING IDENTITY ON A COMPUTING DEVICE

(75) Inventors: Filip Nguyen, Brno (CZ); Martin Vecera, Brno (CZ)

(73) Assignee: Red Hat, Inc., Raleigh, NC (US)

(*) Notice: Subject to any disclaimer, the term of this patent is extended or adjusted under 35 U.S.C. 154(b) by 0 days.

(21) Appl. No.: 13/480,625

(22) Filed: May 25, 2012

(65) Prior Publication Data

US 2013/0318618 A1    Nov. 28, 2013

(51) Int. Cl.
*G06F 21/00*    (2013.01)
(52) U.S. Cl.
USPC .......................................................... 726/27
(58) Field of Classification Search
USPC ................................................ 726/22, 26, 27
See application file for complete search history.

(56) References Cited

U.S. PATENT DOCUMENTS

| | | | |
|---|---|---|---|
| 2009/0217163 A1* | 8/2009 | Jaroker | 715/700 |
| 2010/0131559 A1* | 5/2010 | van Riel et al. | 707/783 |
| 2012/0311698 A1* | 12/2012 | Erlingsson | 726/18 |

* cited by examiner

*Primary Examiner* — Edward Zee
(74) *Attorney, Agent, or Firm* — Lowenstein Sandler LLP

(57) ABSTRACT

A mechanism for securing information by hiding identity in a computing device is disclosed. A method includes generating, by a computing device, a dummy profile of the computing device. The dummy profile is a clone of a home profile stored in the computing device and the home profile is assigned to a user authorized to use the computing device. The method also includes altering, based on instructions from the user, the dummy profile to remove data that the user indicates is not to be included in the dummy profile. The method further includes switching a current operating profile of the computing device from the home profile to the dummy profile and executing the computing device in a normal operation mode using the dummy profile.

20 Claims, 4 Drawing Sheets

SECURING INFORMATION BY HIDING IDENTITY ON A COMPUTING DEVICE

TECHNICAL FIELD

The embodiments of the invention relate generally to security related networks and, more specifically, relate to a mechanism for securing information by hiding identity in computing devices.

BACKGROUND

It is very common for computing devices to have basic security mechanisms incorporated into their systems. Such security mechanisms prevent others from accessing the devices and using the resources provided by the device.

A typical computing device, such as a mobile phone, stores information including text messages, contacts, notes, etc. A user of the mobile phone may wish to keep such information hidden from third parties that attempt to gain access to the information without permission. As such, the user deploys standard means, such as creating passwords and secret lock and unlocks sequences, which attempt to prevent these third parties from accessing and extracting the information from the mobile phone. However, such standard means are often not sufficient to secure the identity information in the computing devices.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
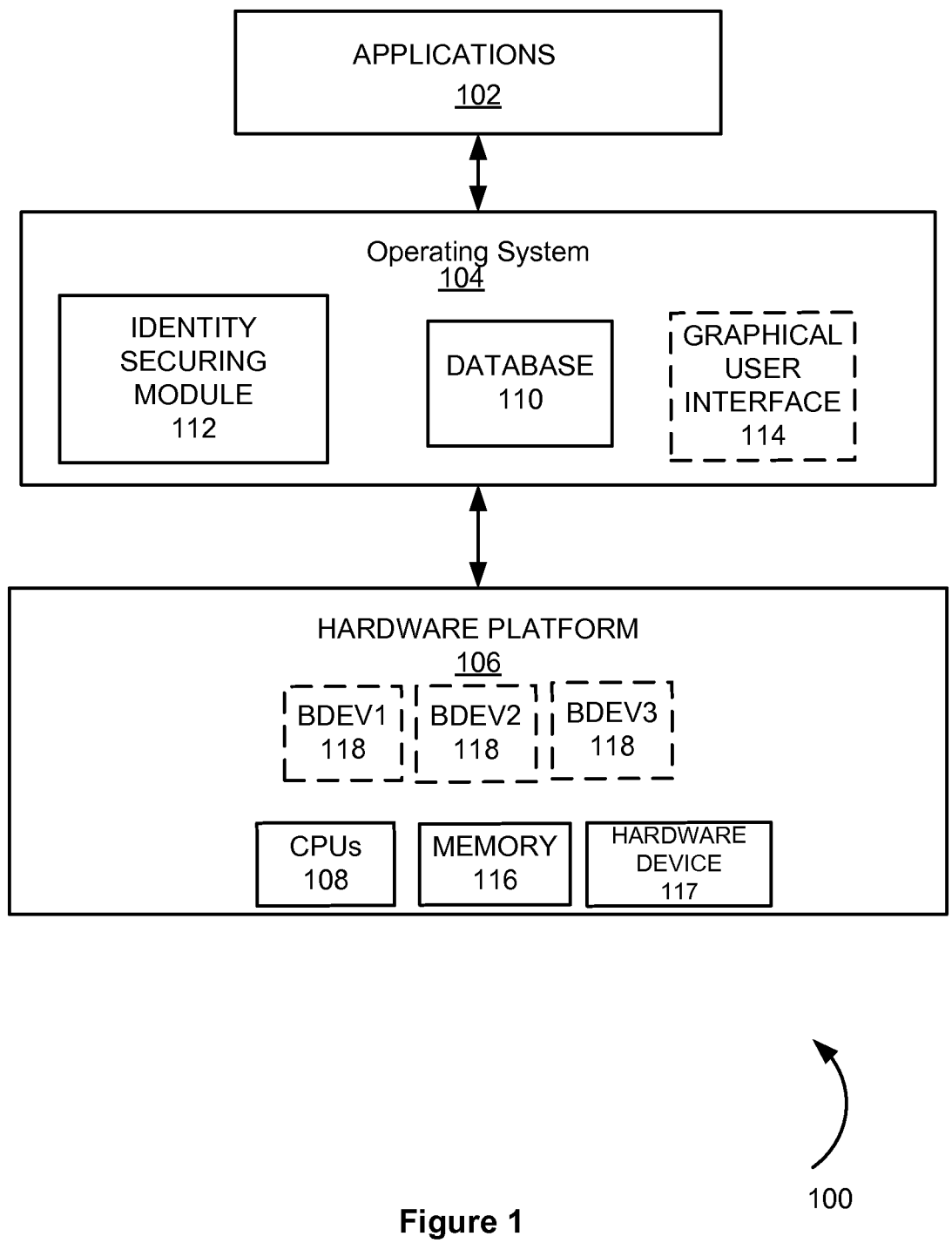
FIG. 1 is a block diagram of a computer system in which the embodiments of the present invention may operate.

Embodiments of the present invention provide for mechanism for securing information by hiding identity in computing devices. A method of embodiments of the invention includes generating, by a computing device, a dummy profile of the computing device. The dummy profile is a clone of a home profile stored in the computing device and the home profile is assigned to a user authorized to use the computing device. The method also includes altering, based on instructions from the user; the dummy profile to remove data that the user indicates is not to be included in the dummy profile. The method further includes switching a current operating profile of the computing device from the home profile to the dummy profile and executing the computing device in a normal operation mode using the dummy profile.

Embodiments of the present invention secure information in the computing device by hiding identity of the authorized user of the computing device. The identity of the authorized user is hidden by creating the dummy profile, which is made available to an unauthorized user. This way, the unauthorized user will only "read" and/or have access to data on the dummy profile without knowing or realizing that there is additional data of the authorized user on the computing device.

In the following description, numerous details are set forth. It will be apparent, however, to one skilled in the art that the present invention may be practiced without these specific details. In some instances, well-known structures and devices are shown in block diagram form, rather than in detail, in order to avoid obscuring the present invention.

Some portions of the detailed descriptions, which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "assigning", "generating", "executing", "adding", "converting", "switching", "altering", "logging", "storing" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide systems and methods for securing information by hiding identity in a computing device. An identity securing module is initialized on an operating system of the computing device. The identity securing module generates a dummy profile of a computing device. The dummy profile is a clone of a home profile stored in the computing device. The home profile is assigned to a user of the computing device. In one embodiment, the identity securing module switches a current operating user profile from the home profile to the dummy profile. The identity securing module also executes a normal operation mode of the computing device using the dummy profile.

In one embodiment, the computing device is mobile phone. The identity securing module adds a new user, i.e. a dummy user, to the mobile phone. In one embodiment, the dummy user is added by creating a new user profile, i.e. dummy profile on the mobile phone. The identity securing module assigns the dummy profile to the dummy user. In one embodiment, the other user is a dummy user. The identity securing module switches a current operating user profile from the home profile to the dummy profile by logging into the mobile phone as the dummy user using the dummy profile.

In another embodiment, the computing device is a PC or workstation. As such, the home profile is a home directory and dummy profile is a dummy directory. The identity securing module functions switches a current operating user profile from the home directory to the dummy directory by converting the dummy directory into a fake root directory which functions similar to the home directory.

FIG. 1 is a block diagram illustrating a computer system 100 in which embodiments of the present invention may be implemented. In one embodiment, the computer system 100 may be a machine such as, for example, any variety of end user devices, such as a personal computer (PC), a laptop, a mobile phone, mobile smart phone, a tablet computer, handheld devices, netbooks, or any other computing device. Furthermore, computer system may comprise a server device. The computer system 100 comprises a hardware platform 106, on top of which runs an operating system (OS) 104 that executes one or more software application programs 102 (i.e., applications 102). In one embodiment, the OS 104 may include Microsoft Windows™, Linux™, Solaris™, Mac™ OS or any other suitable OS for managing operations on the computer system 100.

The hardware platform 106 may include one or more central processing units (CPUs) 108 and memory 116. In one embodiment, the memory 116 comprises one or more hardware and software devices, which may be located internally and externally to the computer system 100. Examples of memory 116 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.). In addition, hardware platform 106 may include additional hardware devices 117, such as network interface cards (NICs), sound or video adaptors, photo/video cameras, printer devices, keyboards, displays or any other suitable device intended to be coupled to a computer system.

In some embodiments, the hardware platform 106 may also include one or more bus devices (BDEVs) 118. In one embodiment, the BDEVs 118 comprise one or more hardware and/or software devices, which may be located internally and/or externally to the computer system 100. Examples of the BDEVs 118 include, but are not limited to, universal bus devices (USB), general purpose interface bus (GPIB), local area network (LAN), or any other suitable device intended to couple to a computer system. In an embodiment, the BDEV 118 may be an integrated circuit (IC) separate from one or more CPUs 108. In another embodiment, the BDEV 118 may be integrated with the one or more CPUs 108.

The OS 104 further includes an identity securing module 112 to secure information of the computer system 100 by hiding identities associated with the computer system 100. The identity securing module 112 interacts with components of the device and with an authorized user of the device to secure data on the computer system 100 by hiding an identity (i.e., profile) of the authorized user, and, thereby, any data associated with the identity, from an unauthorized user of the computer system 100.

In one embodiment, the identity securing module 112 secures information of the computing system 100 by creating a dummy profile. The dummy profile is a clone of a user profile in the computer system 100. In one embodiment, a switch of a current operating profile is made from the user profile to the dummy profile. Subsequently, the computer system 100 executes in a normal operation mode using the dummy profile. The OS 104 may also include a graphical user interface (GUI) 114 configured to allow an authorized user to define, access, and edit the dummy profile. In one embodiment, the use of a dummy profile is implemented when computer system 100 is a mobile phone.

In another embodiment, the identity securing module 112 secures information of the computer system 100 by creating a dummy directory. In one embodiment, the dummy directory is a new directory which functions similar to a home directory of an authorized user, and includes files copied to the dummy directory in order to make it look like a real file system. A chroot command is used to bind this dummy directory as a root directory, so that an unauthorized user of the computer system 100 perceives this dummy directory as the root directory and will not be aware of any other user's directory. Subsequently, the computer system 100 executes in a normal operation mode using the dummy directory as the root directory. The GUI 114 provided by OS 104 allows the authorized user of computer system 100 to define, access and edit the dummy directory.

Figure 2:
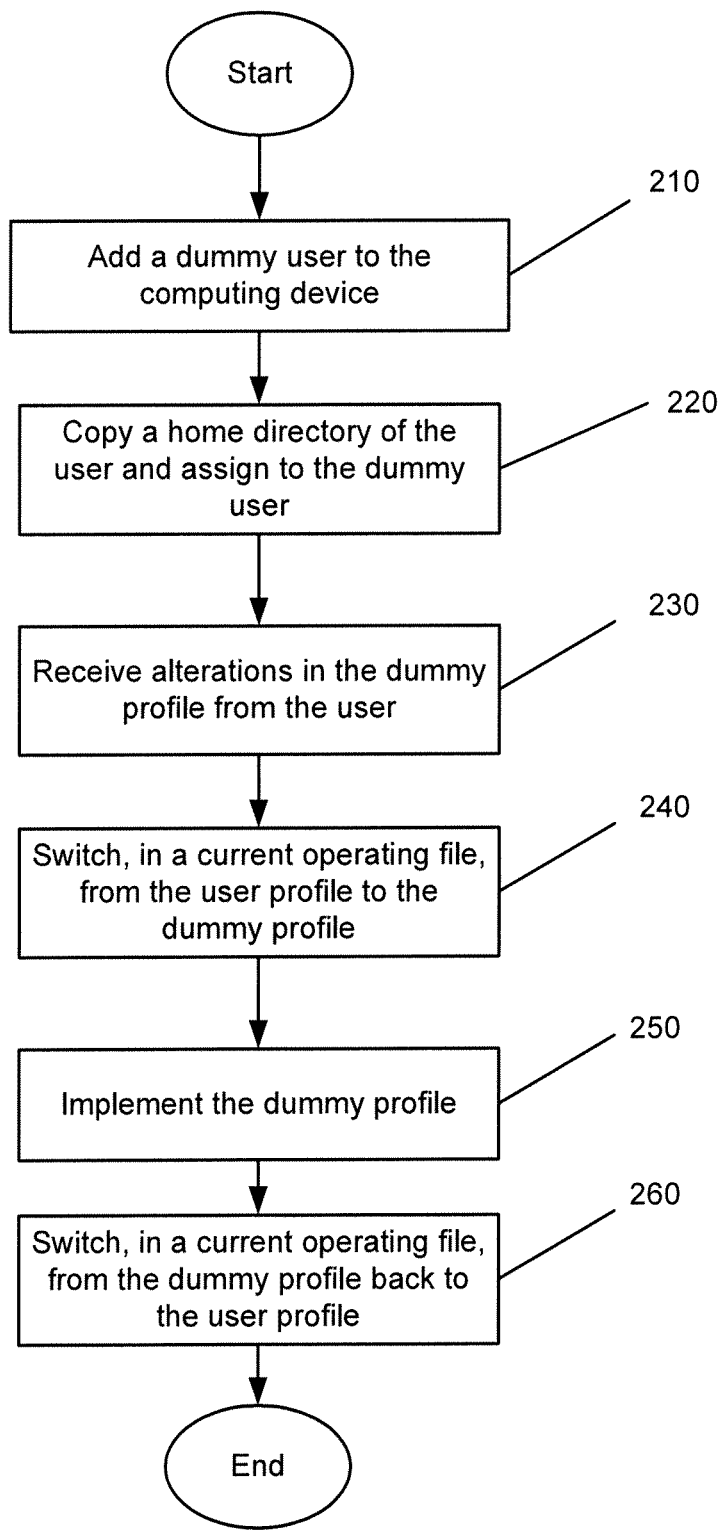
FIG. 2 is a flow diagram of one embodiment of a method for securing information in a computing device.

FIG. 2 is a flow diagram illustrating a method 200 for securing information by hiding identity via a dummy profile according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by identity securing module 112 of FIG. 1 executing in a computing device, such as computer system 100 of FIG. 1.

Method 200 begins at block 210 where a new user, i.e. a dummy user, is added to the computing device. In one embodiment, an adduser command in a Unix® environment is executed to add the dummy user to the computing device. At block 220, a home directory of the user is copied and assigned to the dummy user. In one embodiment, the home directory is copied using a cp command in a Unix® environment. Then, at block 230, alterations to the dummy profile are received from the user. In one embodiment, the dummy profile is user-defined, such as the user selects what information he or she wishes to have in the dummy profile. Such information includes, but not limited to, text messages, phone numbers, notes etc.

At block 240, a switch is made in a current operating profile of the computer device from the user profile to the dummy profile. In one embodiment, the switch is implemented by an application running on the mobile phone. In one embodiment, the application is a daemon, which runs as a background process (instead of being under direct control of an interactive user) in an OS of the computing device. In one embodiment, the daemon functions to log in as the dummy user upon a user input of a sequence of keys on the computing device. In one embodiment, the sequence of keys is configurable by the user. In one embodiment, the sequence of keys may include clicking in a specific way on an icon on a screen of the mobile phone.

At block 250, the dummy profile is implemented by the computing device. In one embodiment, the computing device functions in a normal operation mode (similar to the user profile) using the dummy profile. In one embodiment, the user utilizes the computing device to perform various functions in the dummy profile mode, such as texting, internet browsing, making phone calls, taking notes, etc. At block 260, a switch is made in the current operating profile of the computer device from the dummy profile back to the user profile. In one embodiment, the switch is initiated when an authorized user, such as the user associated with the user profile, inputs the secret sequence of keys in a similar manner as described above. In another embodiment, the switch is initiated by the user by inputting the secret sequence in a reverse order to an order used when switching from the user profile to the dummy profile described above.

Figure 3:
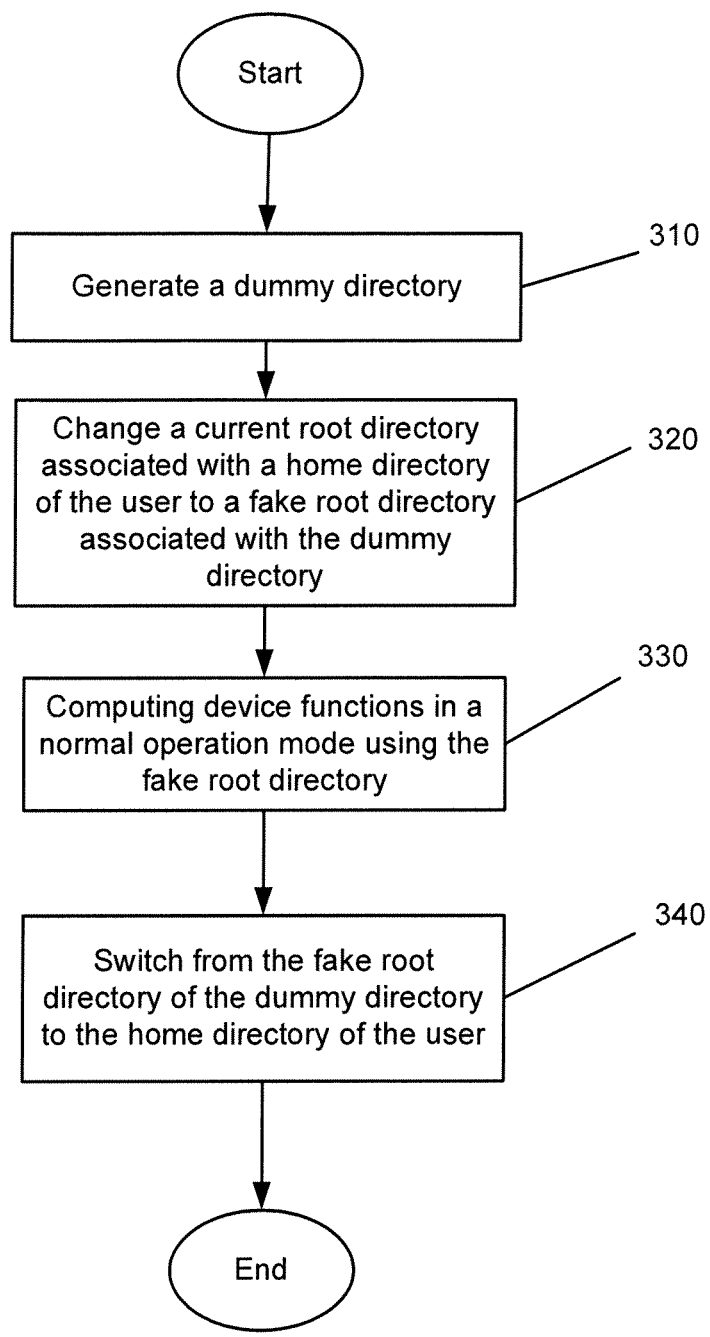
FIG. 3 is a flow diagram of another embodiment of a method for securing information in a computing device.

FIG. 3 is a flow diagram illustrating a method 300 for securing information by hiding identity via a dummy directory according to another embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by the identity module 112 of FIG. 1 executing in a computing device, such as computer system 100 of FIG. 1.

Method 300 begins at block 310 where a dummy directory is generated. In one embodiment, the dummy directory is a clone of a home directory of a user stored in a directory structure of the computing device. The home directory includes one or more files assigned to the user. In one embodiment, the files include, but are not limited to, configuration files, text documents, music, pictures or videos. In one embodiment, the home directory is copied to the dummy directory using a cp command in a Unix® environment.

At block 320, a current root directory associated with a home directory of the user is changed to a fake root directory associated with the dummy directory. A root directory is the first or top-most directory in a hierarchy of computer file systems. In one embodiment, a chroot command in Unix® is used to convert the dummy directory into the fake root directory, which is a sub-directory that functions as a root directory. Upon the conversion, the dummy directory functions as the fake root directory. Upon changing to the fake root directory, all the sub-directories in the root directory are also changed to fake sub-directories. As such, a fake home directory of the fake root directory functions similar to the user's home directory.

At block 330, the computing device functions in a normal operation mode using the fake root directory. As discussed above, the fake home directory of the fake root directory functions similar to the user's home directory. As such, the processes in the fake root directory are executed similar to the user's home directory. At block 340, the root directory is switched from the fake root of the dummy directory to the user's home directory. In one embodiment, such switch is implemented by executing the chroot command.

In one embodiment, prior to executing the chroot command, a temporary directory is created in the fake root directory. Then, the fake root directory of a process is changed to the temporary directory, using the chroot command, which is switched to the home directory using the chroot command. As such, the PC or the workstation is returned to its original state of executing the processes using the home directory.

Figure 4:
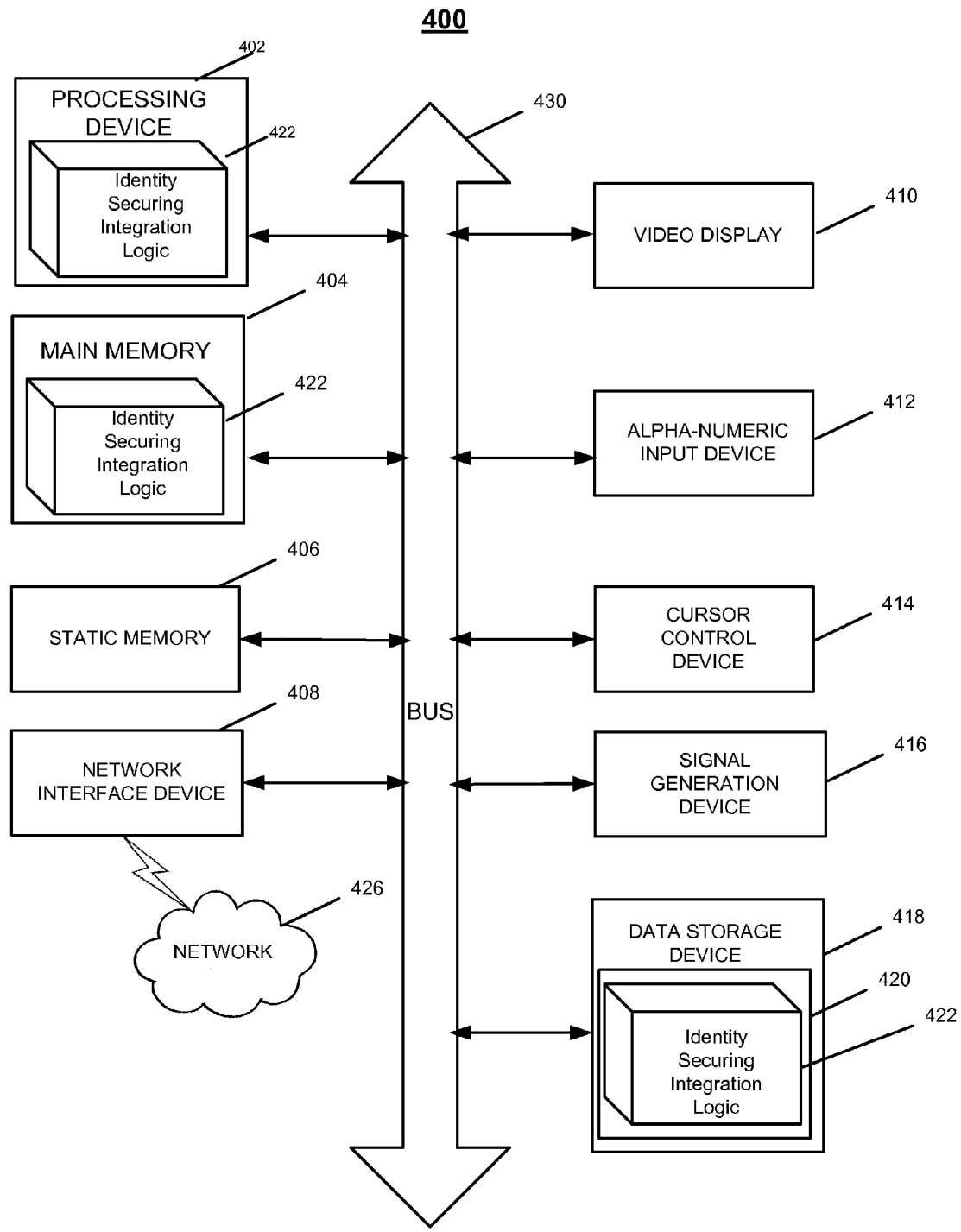
FIG. 4 illustrates a block diagram representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 400 includes a processing device 402, a memory 406 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute identity securing logic 422 for performing the operations and steps discussed herein. In one embodiment, identity securing module 112 described with respect to FIG. 1 performs the identity securing logic 422.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 614 (e.g., a mouse), and a signal generation device 416 (e.g., a speaker).

The data storage device 418 may include a machine-accessible storage medium (or more specifically a computer-readable storage medium) 420 on which is stored one or more sets of instructions (e.g. identity securing logic 422) embodying any one or more of the methodologies of functions described herein, such as methods 200 and 200 for providing securing information by hiding identity described with respect to FIGS. 2 and 3, respectively. The identity securing logic 422 may also reside, completely or at least partially, within the memory 404 and/or within the processing device 402 during execution thereof by the computer system 400; the memory 406 and the processing device 402 also constituting machine-accessible storage media.

The machine-readable storage medium 420 may also be used to store the identity securing logic 422 persistently containing methods that call the above applications. While the machine-accessible storage medium 420 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    generating a dummy profile of a computing device, wherein the generated dummy profile is a clone of a home profile stored in the computing device and the home profile is assigned to a user authorized to use the computing device;
    altering, by a processing device, in view of instructions from the user, the generated dummy profile, wherein the altering comprising removing data from the generated dummy profile that the user indicates is not to be included in the altered dummy profile;
    switching a current operating profile of the computing device from the home profile to the altered dummy profile; and
    executing the computing device in a normal operation mode using the altered dummy profile.

2. The method of claim 1 further comprising:
    switching the current operating profile from the altered dummy profile back to the home profile.

3. The method of claim 1 wherein the altered dummy profile is user-defined.

4. The method of claim 1 wherein the computing device is at least one of a mobile device, a personal computer, or a workstation.

5. The method of claim 1 further comprising adding a new user to the computing device and assigning the altered dummy profile to the new user, wherein the new user is a dummy user that is not associated with a human user of the computing device.

6. The method of claim 5 wherein the adding the new user comprises executing an adduser command in a version of UNIX operating system environment.

7. The method of claim 5 wherein the switching comprises logging into the computing device as the dummy user using the altered dummy profile.

8. The method of claim 1 wherein the home profile is a home directory in the computing device and the altered dummy profile is a dummy directory in the computing device.

9. The method of claim 8 wherein the switching comprises converting the dummy directory into a fake root directory.

10. The method of claim 9 wherein converting the dummy directory into the fake root directory comprises executing a chroot command in a version of UNIX operating system environment.

11. A system comprising:
    a memory;
    a processing device coupled to the memory, the processing device to:
      generate a dummy profile of a computing device, wherein the generated dummy profile is a clone of a home profile stored in the computing device and the home profile is assigned to a user authorized to use the computing device;
      alter, in view of instructions from the user, the generated dummy profile, wherein the alter comprise remove data from the generated dummy profile that the user indicates is not to be included in the altered dummy profile;
      switch a current operating profile of the computing device from the home profile to the altered dummy profile; and
      execute the computing device in a normal operation mode using the altered dummy profile.

12. The system of claim 11, the processing device to switch the current operating profile from the altered dummy profile back to the home profile.

13. The system of claim 11, the processing device to add a new user to the computing device and assign the altered dummy profile to the new user, wherein the new user is a dummy user that is not associated with a human user of the computing device.

14. The system of claim 13 wherein the switch comprises log into the computing device as the dummy user using the altered dummy profile.

15. The system of claim 11 wherein the home profile is a home directory in the computing device and the altered dummy profile is a dummy directory in the computing device, wherein the switch comprises convert the dummy directory into a fake root directory.

16. A non-transitory computer-readable storage medium that provides instructions which, when executed by a processing device, cause the processing device to perform operations comprising:
    generating a dummy profile of a computing device, wherein the generated dummy profile is a clone of a home profile stored in the computing device and the home profile is assigned to a user authorized to use the computing device;

altering, by the processing device, in view of instructions from the user, the generated dummy profile, wherein the altering comprising removing data from the generated dummy profile that the user indicates is not to be included in the altered dummy profile;

switching a current operating profile of the computing device from the home profile to the altered dummy profile; and executing the computing device in a normal operation mode using the altered dummy profile.

17. The non-transitory computer-readable storage medium of claim 16, the operations further comprising:

switching the current operating profile from the altered dummy profile back to the home profile.

18. The non-transitory computer-readable storage medium of claim 16, the operations further comprising:

adding a new user to the computing device and assigning the altered dummy profile to the new user, wherein the new user is a dummy user that is not associated with a human user of the computing device.

19. The non-transitory computer-readable storage medium of claim 18 wherein the switching further comprises:

logging into the computing device as the dummy user using the altered dummy profile.

20. The non-transitory computer-readable storage medium of claim 16 wherein the home profile is a home directory in the computing device and the altered dummy profile is a dummy directory in the computing device, wherein the switch comprises converting the dummy directory into a fake root directory.

* * * * *